(12) United States Patent
Imai

(10) Patent No.: US 8,456,975 B2
(45) Date of Patent: Jun. 4, 2013

(54) PHASE ERROR DETECTION APPARATUS, PHASE ERROR DETECTION METHOD, AND REPRODUCTION APPARATUS

(75) Inventor: Mitsugu Imai, Kanagawa (JP)

(73) Assignee: Sony Corporation, Tokyo (JP)

( * ) Notice: Subject to any disclaimer, the term of this patent is extended or adjusted under 35 U.S.C. 154(b) by 286 days.

(21) Appl. No.: 12/873,469

(22) Filed: Sep. 1, 2010

(65) Prior Publication Data

US 2011/0058462 A1    Mar. 10, 2011

(30) Foreign Application Priority Data

Sep. 10, 2009    (JP) ................. 2009-209582

(51) Int. Cl.
  *G11B 7/00*    (2006.01)
(52) U.S. Cl.
  USPC ............. 369/53.34; 369/47.28; 369/59.2
(58) Field of Classification Search
  USPC .......... 369/59.2, 59.22, 53.34, 124.14, 47.28
  See application file for complete search history.

(56) References Cited

U.S. PATENT DOCUMENTS

| | | | | |
|---|---|---|---|---|
| 6,104,682 A * | 8/2000 | Konishi | ................. | 369/44.34 |
| 6,304,538 B1 * | 10/2001 | Hayashi | ................. | 369/59.22 |
| 6,934,229 B2 * | 8/2005 | Fujiwara | ................. | 369/47.28 |
| 7,327,642 B2 * | 2/2008 | Yamada et al. | ............ | 369/44.29 |
| 2002/0126598 A1 * | 9/2002 | Fujiwara | ................. | 369/47.31 |
| 2005/0063276 A1 * | 3/2005 | Ogura | ................. | 369/59.22 |
| 2005/0207516 A1 * | 9/2005 | Tonami | ................. | 375/341 |
| 2007/0047690 A1 * | 3/2007 | Zhao et al. | ................. | 375/376 |
| 2008/0231332 A1 * | 9/2008 | Nakata et al. | ................. | 327/147 |

FOREIGN PATENT DOCUMENTS

| | | |
|---|---|---|
| JP | 08-069672 | 3/1996 |
| JP | 2003-006864 A | 1/2003 |

* cited by examiner

*Primary Examiner* — Thomas Alunkal
(74) *Attorney, Agent, or Firm* — Wolf, Greenfield & Sacks, P.C.

(57) ABSTRACT

A phase error detection apparatus includes: a sampling block; a first phase error calculation block; a second phase error calculation block; and a selective output block.

8 Claims, 11 Drawing Sheets

F I G . 3
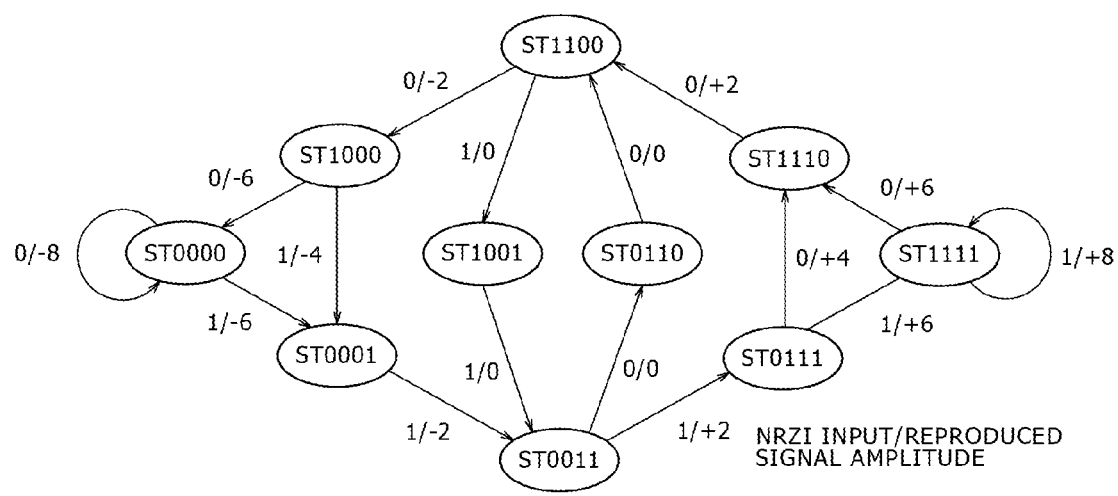

PHASE ERROR DETECTION APPARATUS, PHASE ERROR DETECTION METHOD, AND REPRODUCTION APPARATUS

BACKGROUND OF THE INVENTION

1. Field of the Invention

The present invention relates to a phase error detection apparatus and a phase error detection method for detecting the phase error of PLL, as well as to a reproduction apparatus for reproducing data from a recording medium on which bit information is recorded.

2. Description of the Related Art

References should be made to Japanese Patent Laid-Open No. Hei 8-69672 and Japanese Patent Laid-Open No. 2003-6864.

As optical recording media from which recorded signals are reproduced by irradiation of light, so-called high recording density optical disks such as BD (Blu-ray Disk: registered trademark) are currently used extensively.

In order to reproduce recorded information from this type of optical disk, there may be carried out PRML (partial response maximum likelihood) decoding.

To execute PRML decoding involves selecting what is known as a PR class corresponding to the characteristics (mainly recording density) of the recording and reproduction system in use. Well-known PR classes include PR(1, 2, 1) and PR(1, 2, 2, 1).

Meanwhile, maintaining a stable PLL (phase locked loop) setup is essential for allowing PRML decoding to exert its full potential.

In ordinary optical disk systems, phase error information about the PLL is often acquired from values in the vicinity of a zero cross point of the reproduced signal. Two typical techniques of obtaining the phase error information, to be explained below, have been known.

FIGS. 11A and 11B are schematic views explanatory of the ordinary techniques of detecting phase errors from values in the vicinity of a zero cross point of the reproduced signal. FIG. 11A is explanatory of the detection technique in effect when the ideal value of the reproduced signal is not zero. FIG. 11B is explanatory of the detection technique for use when the ideal value of the reproduced signal is zero.

If PR(1, 2, 1) is adopted as the PR class, then the ideal value of the reproduced signal following PR equalization is not zero. In other words, the timing for ideal sampling is at a point different from the zero cross point. The technique explained in reference to FIG. 11A is thus the phase error detection technique to be adopted where the ideal value of the reproduced signal is other than zero with PR(1, 2, 1) in effect.

If PR(1, 2, 2, 1) is adopted, then the ideal value of the reproduced signal following PR equalization is zero. That is, the zero cross point coincides ideally with the sampling point. The technique explained in reference to FIG. 11B is thus the phase error detection technique to be adopted where the ideal value of the reproduced signal is zero with PR(1, 2, 2, 1) in effect.

When the ideal value of the reproduced signal is other than zero as shown in FIG. 11A, a phase error $\Delta\tau$ is obtained using the following expression:

$$\Delta\tau = \text{sign}*(A_{n-1}+A_n) \qquad \text{[Expression 1]}$$

where, $A_{n-1}$ denotes the sampling value before a zero cross of the reproduced signal, and $A_n$ represents the sampling value after the zero cross of the reproduced signal.

In the above expression, "sign" is either "+" or "−" depending on the zero cross direction (from positive to negative or vice versa).

If PR(1, 2, 1) is adopted, the absolute value of the sampling value $A_{n-1}$ before the zero cross is ideally the same as the absolute value of the sampling value $A_n$ after the zero cross. Thus adding up the values $A_{n-1}$ and $A_n$ as in the above expression provides a value indicating both the amount of the error from an ideal phase and the polarity of that error (i.e., phase advanced or delayed).

FIG. 11A shows a state in which zero is crossed in the positive-to-negative direction. If zero is crossed conversely in the negative-to-positive direction, then the relation between the polarity of the value calculated by "$A_{n-1}+A_n$" and the advance/delay of the phase is inverse to what is shown in FIG. 11A. The "sign" in the above expression is used to correct the incorrect sign (i.e., polarity) of the value "$A_{n-1}+A_n$" stemming from the difference of the zero-cross direction.

Where the ideal value of the reproduced signal is zero as shown in FIG. 11B, the phase error $\Delta\tau$ is detected based on the concept explained hereunder.

FIG. 11B shows three states: one in which the phase error in the waveform of the reproduced signal at a zero cross is zero (waveform in the middle), a state in which the phase is advanced (waveform on the left), and a state in which the phase is delayed (waveform on the right).

It is reaffirmed here that the phase error of the PLL occurs as a difference from the ideal point of the sampling timing for the reproduced signal. If the phase error were to be indicated faithfully in terms of the difference of the sampling timing on the same reproduced signal, the phenomenon would be too complicated to illustrate. For purpose of simplification and illustration, the sampling timing is thus shown in the three phase states: ideal, advanced, and delayed, depicted individually in waveforms.

In the figures, the sampling timing (i.e., sampling point) on the time axis, illustratively while the phase is being advanced, is indicated as solid points at which the waveform of the reproduced signal shifted to the right as viewed on the plan view of the figures coincides with the waveform of the reproduced signal in the ideal state with the phase advanced. In like manner, the sampling timing in effect while the phase is being delayed is indicated as solid points at which the waveform of the reproduced signal shifted to the left as viewed on the plan view of the figures coincides with the waveform of the reproduced signal in the ideal state with the phase delayed.

At this point, the zero cross point of the reproduced signal in the ideal state is assumed to be a reference sampling point $A_n$. In reference to the sampling point $A_n$, the sampling point before the zero cross of the reproduced signal in the ideal state is assumed to be $A_{n-1}$, and the sampling point after the zero cross is assumed to be $A_{n+1}$.

FIG. 11B shows the sampling points corresponding to the ideal, advanced, and delayed states individually. In this setup, where the phase is advanced, the sampling point before the zero cross is indicated in FIG. 11B as $A_{n-1}$ and the sampling point after the zero cross as $A_n$. Where the phase is delayed, the sampling point before the zero cross is $A_n$ and the sampling point after the zero cross is $A_{n+1}$.

In the case of FIG. 11B, the value of the sampling point $A_n$ in the ideal state where there is no phase error is zero. As will be understood from this, the value of the sampling point $A_n$ indicates the phase error with PR(1, 2, 2, 1) in effect where the ideal value of the reproduced signal is zero.

That is, where the ideal value of the reproduced signal is zero and where the phase is advanced, the phase error $\Delta\tau$ is given by the following expression:

$$\Delta\tau = \text{sign} * \min(A_n, A_{n-1}) \quad \text{[Expression 2]}$$

where, $A_{n-1}$ denotes the value of the sampling point before the zero cross and $A_n$ represents the value of the sampling point after the zero cross.

Where the phase is delayed, the phase error $\Delta\tau$ is given by the following expression:

$$\Delta\tau = \text{sign} * \min(A_{n+1}, A_n) \quad \text{[Expression 3]}$$

where, $A_n$ denotes the value of the sampling point before the zero cross and $A_{n+1}$ represents the value of the sampling point after the zero cross.

In the above expressions 2 and 3, the term "min(x, y)" constitutes an operator for selecting either "x" or "y," which is the smaller of the two in absolute value.

An actual circuit determines whether the reproduced signal has reached a zero cross by comparing the current value of the reproduced signal with the immediately preceding value thereof to see if the polarity has changed from one value to the other. In view of this technique of detecting the zero cross point, the above-described expressions 2 and 3 may be arranged into the following single expression 4:

$$\Delta\tau = \text{sign} * \min(A_k, A_{k-1}) \quad \text{[Expression 4]}$$

where, $A_k$ denotes the value of the sampling point at which the zero cross is detected and $A_{k-1}$ represents the value of the immediately preceding sampling point.

SUMMARY OF THE INVENTION

As described above, with PR(1, 2, 1) in effect where the ideal value of the reproduced signal is other than zero, the technique explained above in reference to FIG. 11A may be used to detect the phase error correctly. With PR(1, 2, 2, 1) in effect where the ideal value of the reproduced signal is zero, the technique described above in reference to FIG. 11B can be used to detect the phase error correctly.

With optical disks getting higher in recording density in recent years, some disks have adopted the PR class of PR(a, b, b, b, a) subject to the constraint length of 5 involving more intersymbol interference than before. More specifically, the representative PR class being adopted today is PR(1, 2, 2, 2, 1).

Illustratively, suppose that what is adopted as the PR class is the above-mentioned PR(1, 2, 2, 2, 1) or the like subject to the constraint length of at least 5 with a:b=1:2. In that case, two patterns of the reproduced signal before and after the zero cross coexist: a reproduced signal pattern in which the ideal value of the reproduced signal is other than zero as shown in FIG. 11A, and a reproduced signal pattern in which the ideal value of the reproduced signal is zero as shown in FIG. 11B.

More specifically, if patterns of 3T (T stands for a channel clock) or more are involved in the zero cross part, what comes into effect is the reproduced signal pattern in which the ideal value of the reproduced signal is other than zero as shown in FIG. 11A. If patterns of 2T are involved in the zero cross part, what is in effect is the reproduced signal pattern in which the ideal value of the reproduced signal is zero as indicated in FIG. 11B.

As recording density is getting higher, short signals such as those with patterns of 2T and 3T have increasingly smaller amplitudes. In this respect, there may be envisaged a phase error detection technique which excludes the zero cross part in FIG. 11B from the detection of the phase error with patterns of 2T involved and which subjects only the zero cross part in FIG. 11A to phase error detection with patterns of 3T or more involved. Specifically, only the reproduced signal pattern shown in FIG. 11A is used to obtain phase error information based on the expression 1 shown above.

However, in actual reproduced signals, the frequency of getting patterns of 2T involved in the zero cross part is appreciably high. Discarding this situation as the object of phase error detection can significantly lower the frequency of updating phase error information. With the phase error information less frequently updated, the follow-up performance of the PLL may deteriorate, which in turn may lower the stability of the PLL.

The present invention has been made in view of the above circumstances and provides innovative arrangements that handle the situation where the adopted PR class is subject to the constraint length of at least 5 and where the pattern of the ideal value of the reproduced signal being zero coexists with the pattern of the ideal value being other than zero, in such a manner that the drop in the frequency of phase error information updates is prevented to ensure the stability of the PLL.

In carrying out the present invention and according to one embodiment thereof, there is provided a phase error detection apparatus including: a sampling block configured to sample an input signal digitally; a first phase error calculation block configured to calculate a phase error using a first operation expression based on $A_{k-1} + A_k$, where $A_k$ denotes the sampling value of the input signal after a zero cross and $A_{k-1}$ represents the sampling value of the input signal before the zero cross; and a second phase error calculation block configured to calculate the phase error using a second operation expression based on $\min(A_k, A_{k-1})$, where $\min(x, y)$ constitutes an operator for selecting either x or y, which is the smaller of the two. The phase error detection apparatus further includes: a selective output block configured to determine whether or not an absolute value $|A_k - A_{k-1}|$ of the difference between the sampling value $A_k$ of the input signal after the zero cross on the one hand, and the sampling value $A_{k-1}$ of the input signal before the zero cross on the other hand, is equal to or smaller than a predetermined first threshold value, the selective output block further outputting selectively as phase error detection information either a calculated value from the first phase error calculation block or a calculated value from the second phase error calculation block depending on the result of the determination.

According to another embodiment of the present invention, there is provided a reproduction apparatus including: a reproduced signal acquisition block configured to acquire a reproduced signal of bit information recorded on a recording medium; and a sampling block configured to sample the reproduced signal digitally. The reproduction apparatus further includes: a first phase error calculation block configured to calculate a phase error using a first operation expression based on $A_{k-1} + A_k$, where $A_k$ denotes the sampling value of the reproduced signal after a zero cross and $A_{k-1}$ represents the sampling value of the reproduced signal before the zero cross; and a second phase error calculation block configured to calculate the phase error using a second operation expression based on $\min(A_k, A_{k-1})$, where $\min(x, y)$ constitutes an operator for selecting either x or y, which is the smaller of the two. The reproduction apparatus still further includes: a selective output block configured to determine whether or not an absolute value $|A_k - A_{k-1}|$ of the difference between the sampling value $A_k$ of the reproduced signal after the zero cross on the one hand, and the sampling value $A_{k-1}$ of the reproduced signal before the zero cross on the other hand, is equal to or smaller than a predetermined first threshold value, the selective output block further outputting selectively as phase error detection information either a calculated value from the first phase error calculation block or a calculated value from the second phase error calculation block depending on the result of the determination. The reproduction apparatus still further includes: a clock generation block configured to generate a clock by performing phase locked loop control known as PLL based on the phase error detection information output by the selective output block.

Suppose now that PR(1, 2, 2, 2, 1) is adopted as the PR class, with attention drawn to sampling values in the vicinity of the zero cross point of the reproduced signal. In that case, if the ideal value of the reproduced signal is other than zero as shown in FIG. 11A (i.e., where patterns of 3T or more are involved in the zero cross part), the absolute value $|A_k-A_{k-1}|$ is always 4 or larger. By contrast, if the ideal value of the reproduced signal is zero as indicated in FIG. 11B (where patterns of 2T are involved in the zero cross part), then the absolute value $|A_k-A_{k-1}|$ is always smaller than 4.

According to the present embodiment outlined above, a check is made to determine whether or not the absolute value $|A_k-A_{k-1}|$ is equal to or smaller than the first threshold value. Depending on the result of the determination, the calculated value from either the first or the second phase error calculation block is selectively output as the phase error detection information. The inventive arrangement makes it possible to obtain the phase error detection information not only where patterns of 3T or more are involved in the zero cross part as shown in FIG. 11A but also where patterns of 2T are involved in the zero cross part as indicated in FIG. 11B. This technique thus allows the phase error information to be updated more frequently than ordinary techniques of acquiring the phase error information solely where patterns of 3T or more are involved in the zero cross part.

As will be understood from the explanation above, according to this embodiment, the check on whether patterns of 3T or more or patterns of 2T are involved in the zero cross part is made by determining if the absolute value $|A_k-A_{k-1}|$ between the sampling values before and after the zero cross is equal to or smaller than the first threshold value.

A technique of performing the check above may conceivably involve using the result of bit detection in the downstream Viterbi decoding process (i.e., matching the data pattern obtained as a result of bit detection against the data pattern corresponding to the zero cross part in question). However, since it takes some time to acquire the result of the bit detection, such a technique will increase the delay of PLL correspondingly. Consequently, a significant delay will be expected in the response of the PLL.

According to the present embodiment, by contrast, whether patterns of 3T or more or patterns of 2T are involved in the zero cross part is determined instantaneously by comparing the absolute value $|A_k-A_{k-1}|$ between the sampling values before and after the zero cross with the first threshold value. As opposed to the above-mentioned ordinary technique of making the pattern matching using the bit detection result, the inventive method virtually eliminates the response delay of the PLL.

According to the present embodiment, when the PR class defined as PR(a, b, . . . , b, a) is adopted as in the case of PR(1, 2, 2, 2, 1) subject to the constraint length of 5 or more with a:b=1:2, it is possible to obtain the phase error information appropriately where not only patterns of 3T or more but also patterns of 2T are involved in the zero cross part. The inventive technique allows the phase error information to be updated more frequently than the ordinary technique of acquiring the phase error information solely where patterns of 3T or more are involved in the zero cross part.

With the phase error information updated more frequently, the stability of the PLL is boosted correspondingly.

According to the present embodiment, whether patterns of 3T or more or patterns of 2T are involved in the zero cross part is determined by checking to see if the absolute value $|A_k-A_{k-1}|$ between the sampling values before and after the zero cross is equal to or smaller than the first threshold value. Compared with the above-mentioned ordinary technique of making the pattern matching using the bit detection result, the inventive arrangement virtually eliminates the response delay of the PLL. In this regard, the stability of the PLL is also enhanced.

BRIEF DESCRIPTION OF THE DRAWINGS

FIG. 3 is a state transition diagram of PR(1, 2, 2, 2, 1);

DETAILED DESCRIPTION OF THE PREFERRED EMBODIMENTS

The preferred embodiments (simply called the embodiment hereunder) will now be described with reference to the accompanying drawings under the following headings:
<1. Overall Structure of the Reproduction Apparatus>
  [1-1. Internal Structure of the Reproduction Apparatus]
  [1-2. Internal Structure of the PLL Circuit]
<2. Phase Error Detection Method Embodying the Present Invention>
  [2-1. Basic Principle]
  [2-2. Specific Error Detection Techniques]
<3. Internal Structure of the Phase Error Detection Circuit>
<4. Effects of Phase Error Detection Carried Out by the Embodiment>
<5. Variations>

<1. Overall Structure of the Reproduction Apparatus>
[1-1. Internal Structure of the Reproduction Apparatus]

Figure 1:
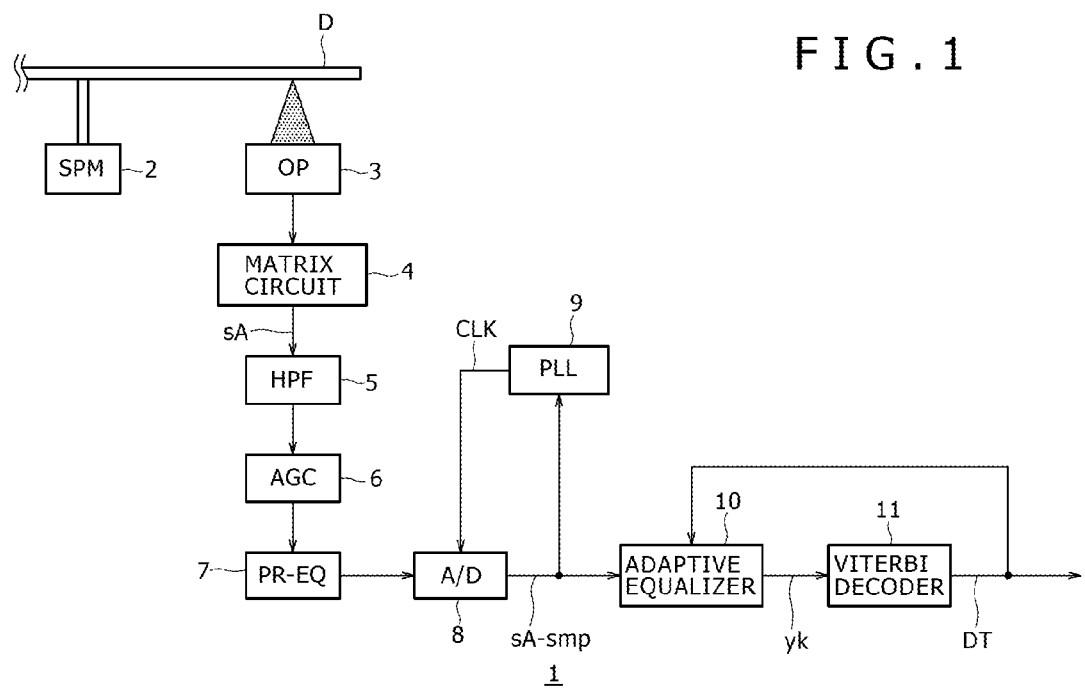
FIG. 1 is a block diagram showing an internal structure of a reproduction apparatus embodying the present invention.

FIG. 1 shows an internal structure of a reproduction apparatus 1 embodying the present invention. What is indicated in FIG. 1 is primarily a reproduction section extracted from the reproduction apparatus 1; the other sections such as the servo section composed of tracking and focusing blocks are omitted from the figure.

In FIG. 1, an optical disk D is a disk-like optical recording medium. The optical recording medium is a storage medium to and from which recording signals are written and read by irradiation of light.

For this example, it is assumed that a binary data sequence of 0s and 1s is recorded to the optical disk D by NRZI (Non Return to Zero Inversion) modulation.

The optical disk D is driven rotatively by a spindle motor (SPM) 2 shown in FIG. 1.

An optical head (optical pickup) 3 irradiates a laser beam emitted by a laser diode to the optical disk D through an objective lens by way of a suitable optical section. The optical head 3 also directs the reflected light from the optical disk D to a photodetector via the suitable optical section. The photodetector provides an electrical signal corresponding to the amount of the reflected light.

A matrix circuit 4 includes a current-to-voltage conversion circuit and a matrix computation/amplification circuit. Using these circuits, the matrix circuit 4 generates necessary signals through matrix computations in keeping with output currents from a plurality of light receiving elements constituting the photodetector in the optical head 3.

More specifically, the matrix circuit 4 generates a reproduced signal sA representative of the recording signal recorded by the above-mentioned NRZI modulation.

The reproduced signal sA generated by the matrix circuit 4 is fed to a PR (partial response) equalizer 7 via a high-pass filter (HPF) 5 and an auto gain control circuit (AGC) 6.

The high-pass filter 5 cuts the DC component and removes low-frequency waves from the reproduced signal sA. The auto gain control circuit 6 is provided to control the reproduced signal sA to a level suitable for the dynamic range of a downstream A/D converter 8.

The gain control provided by the auto gain control circuit 6 is an important function that enables case determination circuits 37 and 38, to be discussed later in reference to FIG. 10, to perform suitable determining operations.

The PR equalizer 7 performs a PR equalization process on the reproduced signal sA through the auto gain control circuit 6.

For this example, PR(1, 2, 2, 2, 1) is adopted as the PR class. The PR equalizer 7 carries out a waveform equalization process with the target characteristic being set for the frequency characteristics established in keeping with the adopted PR(1, 2, 2, 2, 1).

The A/D converter 8 digitally samples the reproduced signal sA having undergone the PR equalization process of the PR equalizer 7, in time with a reproduction clock CLK generated by a PLL (phase locked loop) circuit 9, to be discussed later. As illustrated, the reproduced signal sA digitally sampled by the A/D converter 8 is called the reproduced signal sA-smp.

The reproduced signal sA-smp obtained by the A/D converter 8 is sent not only to the PLL circuit 9 but also an adaptive equalizer 10.

The PLL circuit 9 generates the above-mentioned reproduction clock CLK based on the reproduced signal sA-smp. The reproduction clock CLK generated by the PLL circuit 9 is fed to the A/D converter 8. Although not shown, the reproduction clock CLK is also supplied as an operation clock to the other relevant blocks such as a Viterbi decoder 11, to be discussed latter. The internal structure of the PLL circuit 9 will be described later.

The adaptive equalizer 10 is typically an LMS-TVF (least mean square transversal filter) constituted by an FIR (Finite Impulse Response) filter and by a tap coefficient calculation block that performs tap coefficient update computations by the so-called least square method. As such, the adaptive equalizer 10 carries out the so-called adaptive equalization process for absorbing fluctuations in the frequency response of the reproduced signal sA stemming from individual deviations of the optical head 3 and optical disk D.

As illustrated, decoded data DT derived from the decoding by the Viterbi decoder 11 is input to the adaptive equalizer 10. The adaptive equalizer 10 performs a waveform equalization process on the above-mentioned reproduced signal sA-smp using as its target signal a replica signal obtained by converting the input decoded data DT into a partial response sequence.

The reproduced signal sA-smp having undergone the equalization process of the adaptive equalizer 10 (the signal will be called the equalized signal yk hereunder) is sent to the Viterbi decoder 11.

The Viterbi decoder 11 binarizes the reproduced signal sA through the so-called Viterbi decoding process. That is, the Viterbi decoder 11 checks the Euclidean distance between the equalized signal yk on the one hand and the partial response of the conceivable bit sequence on the other hand, and outputs as the result of the detection a bit sequence such as to makes the distance the shortest.

The decoded data DT obtained by the decoding process of the Viterbi decoder 11 is fed not only to the above-mentioned adaptive equalizer 10 but also to a reproduced data decoder, not shown, which provides reproduced data illustratively through run length limited decoding and error correction.

[1-2. Internal Structure of the PLL Circuit]

Figure 2:
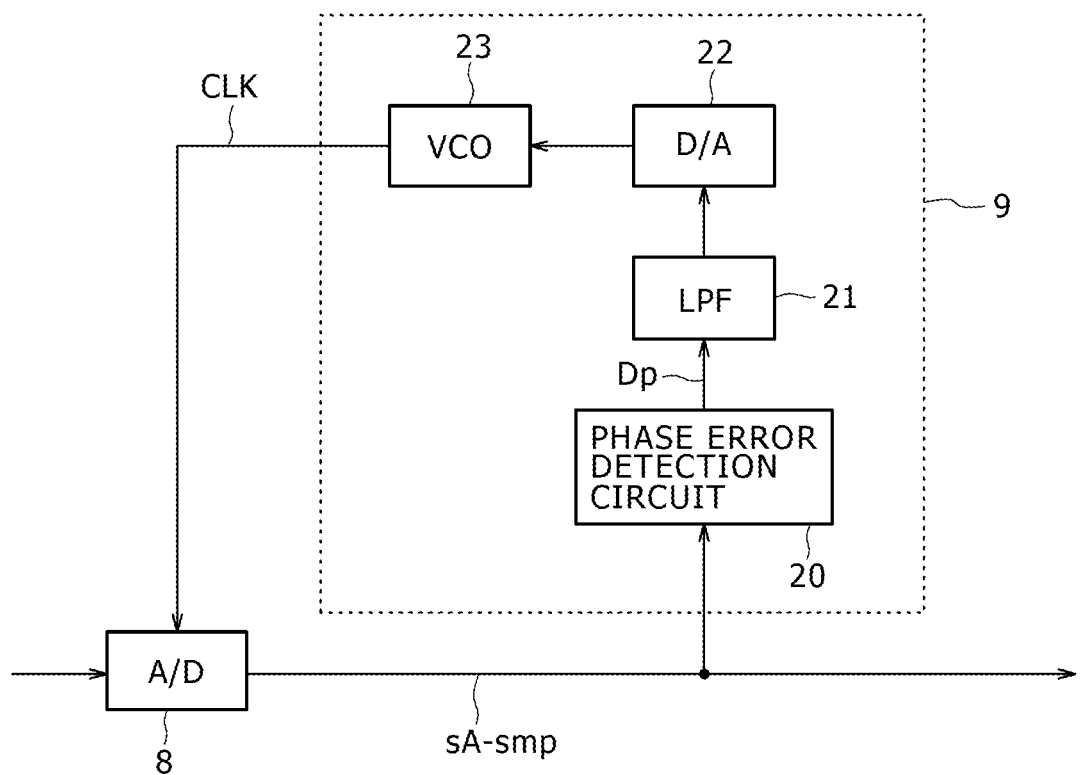
FIG. 2 is a block diagram showing an internal structure of a PLL circuit held by the reproduction apparatus as the embodiment of the invention.

FIG. 2 shows an internal structure of the PLL circuit 9 included in FIG. 1. FIG. 2 also indicates the A/D converter 8 shown in FIG. 1 along with the internal structure of the PLL circuit 9.

As illustrated, the PLL circuit 9 includes a phase error detection circuit 20, a low-pass filter (LPF) 21, a D/A converter 22, and a VCO (voltage control oscillator) 23. Given the reproduced signal sA-smp from the A/D converter 8, the phase error detection circuit 20 detects a phase error with regard to the ideal state of the reproduction clock CLK, and outputs phase error information Dp indicative of the result of the detection.

The internal structure of the phase error detection circuit 20 of this embodiment will be discussed later.

The phase error information Dp output from the phase error detection circuit 20 is converted to an analog signal by the D/A converter 22 through the low-pass filter 21, and the resulting analog signal is sent to the VCO 23.

Based on the phase error information (i.e., phase error signal) Dp input through the D/A converter 22, the VCO 23 performs phase control of its own oscillation signal so as to generate a reproduction clock CLK synchronized with the changing point of the reproduced signal sA.

<2. Phase Error Detection Method Embodying the Present Invention>

[2-1. Basic Principle]

As will be understood from the preceding explanation, PR(1, 2, 2, 2, 1) is adopted as the PR class for this embodiment.

Figure 11A:
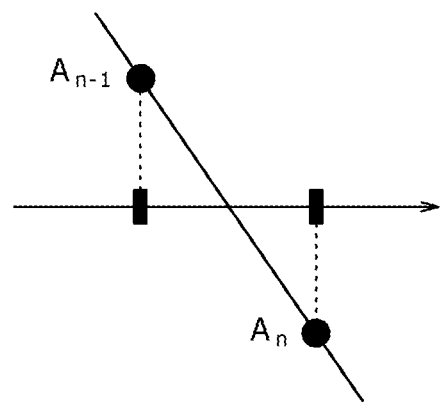
FIGS. 11A and 11B are schematic views explanatory of phase error detection techniques for use where the ideal value of a reproduced signal is other than zero and where the ideal value thereof is zero.
Figure 11B:
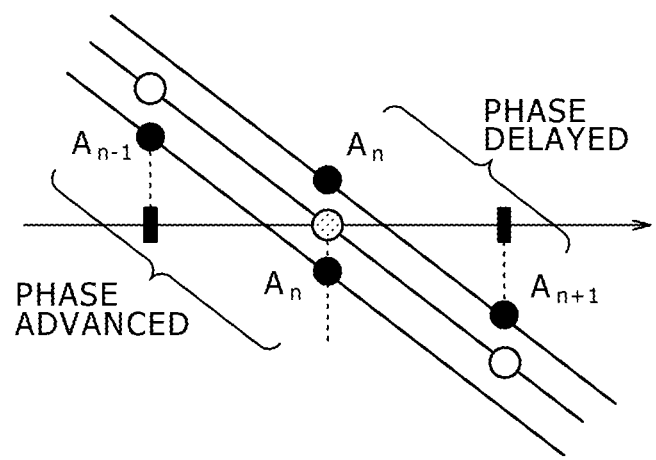

As mentioned earlier, what may be adopted here as the PR class is PR(1, 2, 2, 2, 1) or the like subject to the constraint length of at least 5 with a:b=1:2. In that case, two patterns of the reproduced signal before and after the zero cross coexist: a reproduced signal pattern in which the ideal value of the reproduced signal is other than zero as shown in FIG. 11A, and a reproduced signal pattern in which the ideal value of the reproduced signal is zero as shown in FIG. 11B. More specifically, where patterns of 3T (T stands for the channel clock) or more are involved in the zero cross part, what comes into effect is the reproduced signal pattern in which the ideal value of the reproduced signal is other than zero as shown in FIG.

11A. Where patterns of 2T are involved in the zero cross part, what is in effect is the reproduced signal pattern in which the ideal value of the reproduced signal is zero as indicated in FIG. 11B.

As discussed above, when the ideal value of the reproduced signal is other than zero as shown in FIG. 11A, the phase error $\Delta\tau$ is obtained using the above-described expression 1.

In the ensuing description, the expression 1 may be rewritten in a manner compatible with the above-mentioned expression 4, as follows:

$$\Delta\tau = \text{sign}^*(A_{n-1} + A_n) \qquad \text{[Expression 1]}$$

where, $A_{k-1}$ denotes the sampling value before the zero cross of the reproduced signal, and $A_k$ represents the sampling value after the zero cross of the reproduced signal. In the rewritten expression 1 above, too, "sign" is either "+" or "−" depending on the zero cross direction (from positive to negative or vice versa).

When the ideal value of the reproduced signal is zero as shown in FIG. 11B, the phase error $\Delta\tau$ is obtained using the expression 4 above. It is reaffirmed here that the expression 4 is defined as follows:

$$\Delta\tau = \text{sign}^* \min(A_k, A_{k-1}) \qquad \text{[Expression 4]}$$

In the above expression, as explained, the term "min(x, y)" constitutes an operator for selecting either "x" or "y," which is the smaller of the two in absolute value.

Where the PR class subject to the constraint length of at least 5 is adopted as in this example, that means recording density is considerably high. As explained earlier, the higher the recording density, the smaller the amplitude of short patterns such as those of 2T or 3T. In view of this, a phase error detection method is conceivable whereby the zero cross part of FIG. 11B involving patterns of 2T as shown in FIG. 11B may be excluded from the phase error detection process and whereby the phase error may be detected only from the zero cross part involving patterns of 3T or more as indicated in FIG. 11A. More specifically, the phase error $\Delta\tau$ may be calculated using the expression 1 only in the case of the pattern shown in FIG. 11A, the result of the calculation being utilized as the phase error.

In practice, however, the frequency of the zero cross part with 2T appearing in the produced signal is appreciably high. If such a case is excluded from the phase error detection process, the frequency of the phase error information getting updated can drop significantly.

With declines in the update frequency of the phase error information, the follow-up performance of the PLL can deteriorate and its stability can suffer accordingly.

According to this embodiment, by contrast, a check is made to determine which of the two cases is in effect: whether the pattern of the zero cross part of the reproduced signal subject to phase error detection involves 3T or more, or 2T. The result of the determination is used as the bass for switching between using the expression 1 and using the expression 4 for phase error detection.

More specifically, if the pattern involves 3T or more (where the ideal value of the reproduced signal is other than zero), the phase error is calculated using the expression 1 above. If the pattern involves 2T (where the ideal value of the reproduced signal is zero), then the phase error is calculated using the expression 4 above.

In the ordinary course of things, the determination of the case above would conceivably be made by a pattern matching process using the decoded result (i.e., result of bit detection) from the Viterbi decoder 11 downstream. More specifically, the data patterns in which the zero cross occurs as shown in FIG. 11A as well as the data patterns in which the zero cross takes place as indicated in FIG. 11B would all be picked up beforehand and matched against the data pattern derived from the decoded result.

However, since it takes considerable time to obtain the result of the bit detection, delays of the PLL would be prolonged correspondingly. As a result, the PLL would develop a significant delay in response.

With the above situation taken into account, this embodiment of the invention envisages making the determination described above by checking the difference in magnitude between the sampling value $A_k$ after the zero cross and the sampling value $A_{k-1}$ before the zero cross, from the point of view to be explained below.

[2-2. Specific Error Detection Techniques]

FIG. 3 is a state transition diagram of PR(1, 2, 2, 2, 1). Referring to FIG. 3 reveals that in the case of PR(1, 2, 2, 2, 1), with 2T signals obtained successively, the output amplitude of the reproduced signal (sampling values) is continuously zero and that where no 2T signal is involved, the zero cross takes place but the output amplitude is other than zero.

The following are three representative cases that may be reached when the state transitions of PR(1, 2, 2, 2, 1) are scrutinized from the viewpoint of whether the ideal value of the reproduced signal is zero or other than zero:

Case 1=ST0000-ST0000-ST0001-ST0011-ST0111
Case 2=ST0000-ST0000-ST0001-ST0011-ST0110-ST1100-ST1000
Case 3=ST0000-ST0000-ST0001-ST0011-ST0110-ST1100-ST1001-ST0011-ST0111

——Case 1——

Case 1 (ST0000-ST0000-ST0001-ST0011-ST0111) above is the representative case in which the ideal value of the reproduced signal is other than zero. In Case 1, the transitions of the ideal value of the reproduced signal are $\{-8, -6, -2, 2\}$.

Figure 4:
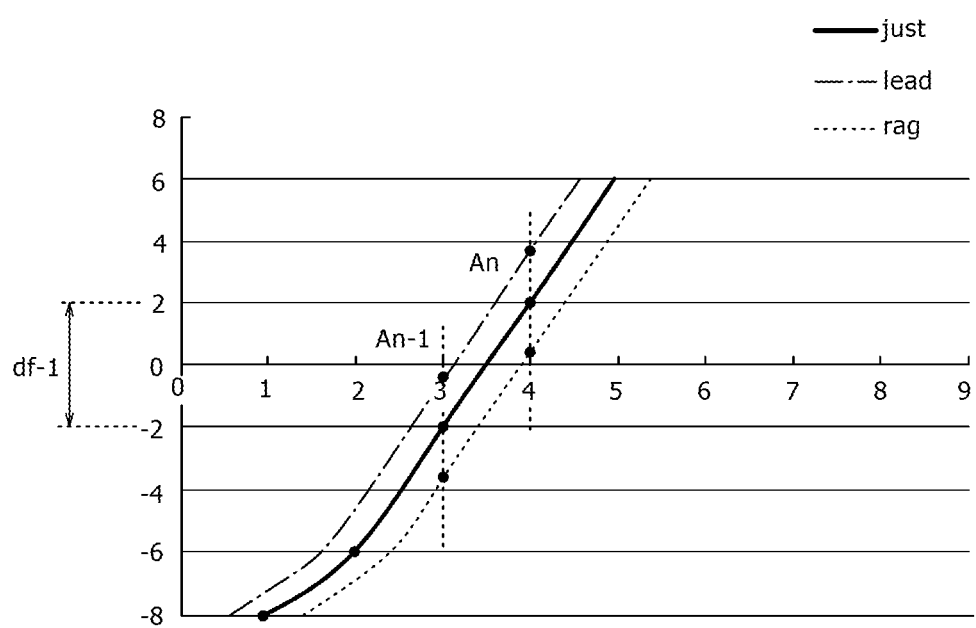
FIG. 4 is a graphic representation explanatory of a phase error detection technique for Case 1.

FIG. 4 is a graphic representation explanatory of the phase error detection technique corresponding to Case 1.

In FIG. 4, as in FIG. 11B, the reproduced signal is shown individually in three states, i.e., ideal, advanced, and delayed, with regard to the phase state of the PLL. More specifically, a solid line in FIG. 4 stands for a reproduced signal with its phase in the ideal state; a dashed lie denotes a reproduced signal with an advanced phase; and a broken line represents a reproduced signal with a delayed phase.

FIG. 4, like FIG. 11B above, illustrates the waveforms of the reproduced signals with their phases in the ideal, advanced, and delayed states, in such a manner that the sampling values involved are positioned in each of the three phase states. The sampling values before and after the zero cross are indicated as $A_{n-1}$ and $A_n$, respectively.

Obviously, in Case 1 where the ideal value of the reproduced signal is other than zero, the value of the phase error is calculated correctly using the expression 1 above.

What is noteworthy in Case 1 is a value "df−1," which is the difference in level between the sampling value $A_k$ ($A_n$ in FIG. 4) after the zero cross on the one hand, and the sampling value $A_{k-1}$ ($A_{n-1}$ in FIG. 4) before the zero cross on the other hand.

Where PR(1, 2, 2, 2, 1) is adopted and where the ideal value of the reproduced signal is other than zero as in Case 1 (i.e., where a signal of 3T or more is involved in the zero cross part), examining the patterns involved reveals that the value "df−1" is always 4 or larger representing the level difference between the sampling value $A_k$ after the zero cross and the sampling value $A_{k-1}$ before the zero cross.

In view of what was discussed above, this embodiment envisages detecting the phase error using the expression 1 if the difference "df−1" between the sampling value $A_k$ after the zero cross and the sampling value $A_{k-1}$ before the zero cross is considered 4 or more in absolute value ($|A_k-A_{k-1}|$). That is, even in the case where the ideal value of the reproduced signal is other than zero, the phase error can be detected appropriately based on the expression 1.

It should be noted that the value "df−1" above being 4 is an ideal value and expected to take on a different value when a noise-superposed reproduced signal is assumed to be actually input.

Thus in practice, a threshold value D against which to determine whether the ideal value of the reproduced signal is zero or other than zero is set not for the exact value "4" but for a somewhat different value that takes the superposed noise and other factors into account. Illustratively, the threshold value D may be 3.8, a value slightly smaller than 4.

As will be understood from the preceding explanation, the determination of whether or not the ideal value of the reproduced signal is other than zero as in Case 1 above is made using the following expression:

$$D < |A_k - A_{k-1}|$$

——Case 2——

What follows is an explanation of Case 2 (ST0000-ST0000-ST0001-ST0011-ST0110-ST1100-ST1000).

Figure 5:
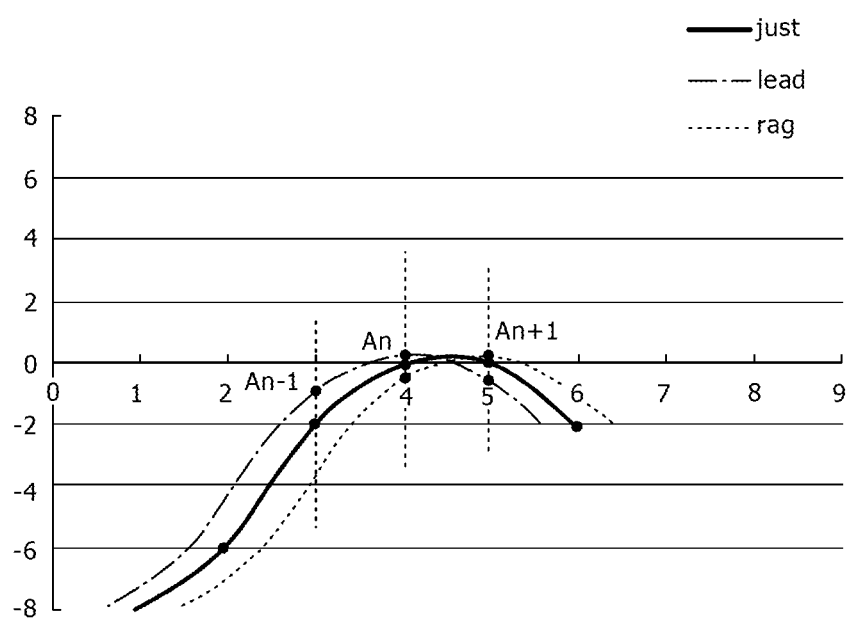
FIG. 5 is a graphic representation explanatory of a phase error detection technique for Case 2.

FIG. 5 is a graphic representation explanatory of the phase error detection technique corresponding to Case 2.

In FIG. 5, as in FIG. 4, the reproduced signal is shown individually in three states, i.e., ideal, advanced, and delayed, with regard to the phase state of the PLL.

FIG. 5, like FIG. 11B above, illustrates the waveforms of the reproduced signals with their phases in the ideal, advanced, and delayed states, in such a manner that the sampling values involved are positioned in each of the three phase states. As in FIG. 11B, the sampling value coinciding with the zero cross point of the reproduced signal in the ideal state is regarded as a reference sampling point indicated as $A_n$. The sampling points immediately preceding and immediately following the reference sampling point $A_n$ are indicated as $A_{n-1}$ and $A_{n+1}$, respectively.

In Case 2, the NRZI data sequence is "011000," and the ideal value of the reproduced signal transits as $\{-8, -6, -2, 0, 0, -2\}$.

In the case where the ideal value of the reproduced signal is zero as shown in FIG. 5, the value of the phase error can be obtained using the expression 4 above.

Here, as will be understood by referencing the values of the sampling pints $A_n$, $A_{n-1}$ and $A_{n+1}$ in FIG. 5, the difference between the sampling value $A_k$ after the zero cross and the sampling value $A_{k-1}$ before the zero cross is 2 or less in absolute value ($|A_k-A_{k-1}|$). This applies to all patterns in which the ideal value of the reproduced signal is zero with PR(1, 2, 2, 2, 1).

At this point, the determination in Case 1 above can be made by checking to see if the value $|A_k-A_{k-1}|$ is larger than the aforementioned threshold value D. Where the situation also applies to Case 2 as described above, the value $|A_k-A_{k-1}|$ is 2 or less, smaller than the threshold value D.

As will be understood from the preceding description, the distinction between Case 1 where the ideal value of the reproduced signal is other than zero and Case 2 where the ideal value of the reproduced signal is zero can be made using the following expression:

$$|A_k - A_{k-1}| \geq D \qquad \text{[Expression 6]}$$

where D stands for the threshold value. That is, if the condition of the expression 6 above is met, the ideal value of the reproduced signal is determined to be zero; if the condition of the expression 6 is not met, then the ideal value of the reproduced signal is determined to be other than zero.

However, what is worrisome here is that in Case 2 of FIG. 5, the difference between the sampling value before the zero cross in the delayed phase state (value $A_n$ in the figure) and the sampling value after the zero cross ($A_{n+1}$ in the figure) is very small in absolute value.

The detection of the phase error using the expression 4 above is the technique of determining which of the two values before and after the zero cross is an error. Ideally, one sampling value (in absolute term) should be considerably larger than the other sampling value (in absolute term) before and after the zero cross. If the difference in absolute term between the two sampling values is not large enough, a noise-superposed reproduced signal input in practice could trigger a faulty determination of the difference between the two values, which could result in calculating the wrong phase error $\Delta\tau$.

According to this embodiment, if a phase delay occurs in Case 2, the inappropriate phase error detection using the expression 4 is avoided by supplementing the condition of the expression 6 with an additional condition.

Specifically, the absolute value $|A_k-A_{k-1}|$ is further subject to a lower threshold value B, shown in the expression 7 below:

$$B \leq |A_k - A_{k-1}| \qquad \text{[Expression 7]}$$

Using the expression 7 above makes it possible to eliminate the situation of the inappropriate phase error detection even if the ideal value of the reproduced signal is zero as with the expression 6 above.

Figure 6:
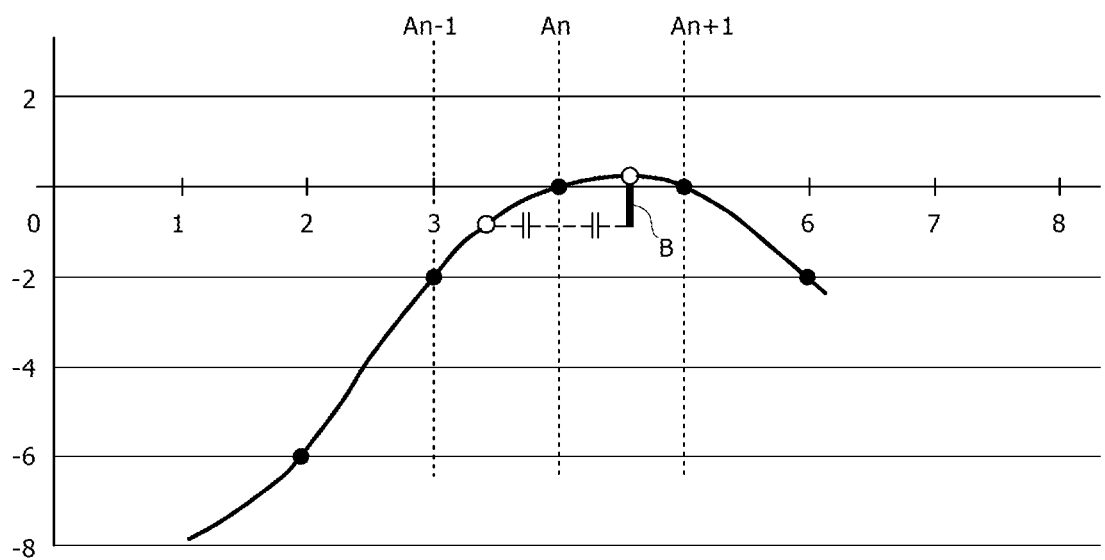
FIG. 6 is a graphic representation explanatory of how to determine a value B (second threshold value)

Illustratively, the lower threshold value B indicated in the expression 7 above may be established as indicated in FIG. 6.

FIG. 6 illustrates the waveform of the reproduced signal in Case 2 shown in FIG. 5, dotted with sampling points (indicated by small solid circles) acquired using an ideal reproduction clock CLK with no phase error. FIG. 6 also shows sampling points, indicated by small hollow circles, before and after the zero cross where a half-clock error with regard to the ideal reproduction clock CLK has occurred.

As shown in FIG. 6, the threshold value B may be regarded as the absolute value of the difference between the two sampling values before and after the zero cross involving the half-clock error relative to the reproduction clock CLK (indicated by a thick straight line in the figure). In other words, the threshold value B is the absolute value $|A_k-A_{k-1}|$ where the half-clock phase error is present.

Figure 7:
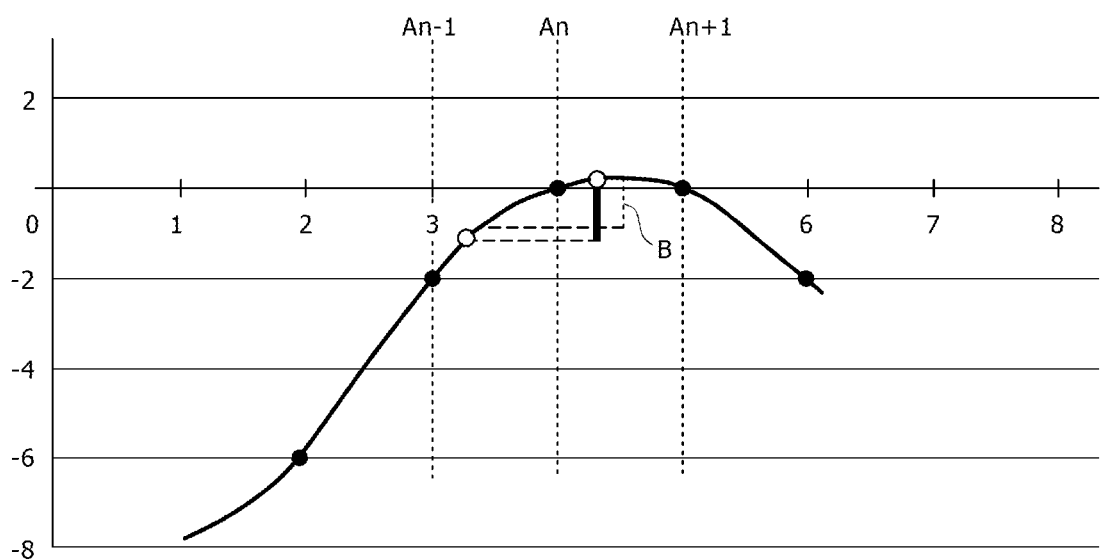
FIG. 7 is a graphic representation showing the absolute value $|A_k-A_{k-1}|$ in effect when the phase is advanced.

As will be understood by referencing FIG. 7, the value $|A_k-A_{k-1}|$ is always larger than the threshold value B when the phase is advanced relative to the ideal state.

Figure 8:
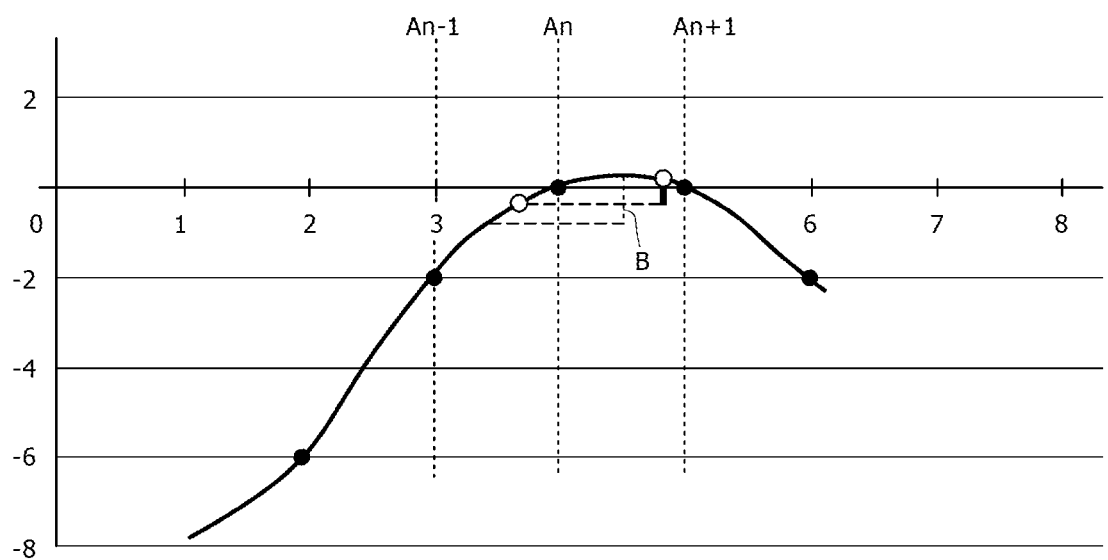
FIG. 8 is a graphic representation showing the absolute value $|A_k-A_{k-1}|$ in effect when the phase is delayed.

Conversely, where the phase is delayed, the value $|A_k-A_{k-1}|$ is always smaller than the threshold value B as can be seen from FIG. 8.

As will be understood from the above explanation, establishing the threshold value B described above in reference to FIG. 6 makes it possible suitably to eliminate the phase delayed state that should not be subject to the phase error detection process based on the determination using the expression 7.

That is, in Case 2 as well where the ideal value of the reproduced signal is zero, the zero cross part not expected to permit precise detection of phase error is eliminated from the phase error detection process. This provides more accurate detection of phase error.

The preceding paragraphs referred only to the situation involving the zero cross direction being from negative to positive (in the rising direction). Obviously, the phase error is also detected in the zero cross part in the falling direction (from positive to negative).

In FIG. 5 explained above, with the zero cross part in the falling direction also shown, the difference between the sampling value $A_k$ after the zero cross and the sampling value $A_{k-1}$ before the zero cross is 2 or less in absolute value ($|A_k-A_{k-1}|$) in the falling direction as well. As will be appreciated from this, the expression 6 above may also be used in the falling direction in order to determine where to carry out the phase error detection based on the expression 4.

It should be noted here that in the falling direction, what needs to be excluded from the process of phase error detection is not the phase delayed state but the phase advanced state. Referencing FIG. 5 reveals that the positional relation between the waveform in the phase delayed state and the waveform in the phase advanced state is inverted between the falling direction and the rising direction. This means that in the failing direction, what should be excluded from the phase error detection is not the phase delayed state but the phase advanced state.

The above-mentioned waveform inversion takes place symmetrically between the falling direction and the rising direction. When the condition of the expression 7 above is used for the determination, the phase advanced state in the falling direction can thus be excluded suitably from the process of phase error detection.

As will be understood from the explanation above, the determination of whether or not the ideal value of the reproduced signal is zero is made by checking to see if the condition of $|A_k-A_{k-1}| \geq D$ indicated as the expression 6 is met.

Here, according to this embodiment, even if the condition of $|A_k-A_{k-1}| \geq D$ is met and even if the ideal value of the reproduced signal is zero, another check is further carried out to see whether or not the condition of $B \leq |A_k-A_{k-1}|$ given as the expression 7 is met. This makes it possible to exclude the zero cross part considered unfit for the phase error detection process because the value of $|A_k-A_{k-1}|$ is very small.

That is, the determination above is made by carrying out checks based on the expressions 6 and 7 successively. A check is first made to see if the condition of $|A_k-A_{k-1}| \geq D$ as the expression 6 is met. If the result of this check is negative (i.e., if the ideal value of the reproduced signal is found other than zero), then the phase error is calculated using the expression 1.

If the condition of $|A_k-A_{k-1}| \geq D$ is determined to be met using the expression 6 (if the ideal value of the reproduced signal is found zero) and if the condition of $B \leq |A_k-A_{k-1}|$ is determined to be met using the expression 7, then the phase error is calculated using the expression 4. If the condition of $B \leq |A_k-A_{k-1}|$ as the expression 7 is not determined to be met, then the phase error is not output.

——Case 3——

Below is an explanation of Case 3 (ST0000-ST0000-ST0001-ST0011-ST0110-ST1100-ST1001-ST0011-ST0111).

Figure 9:
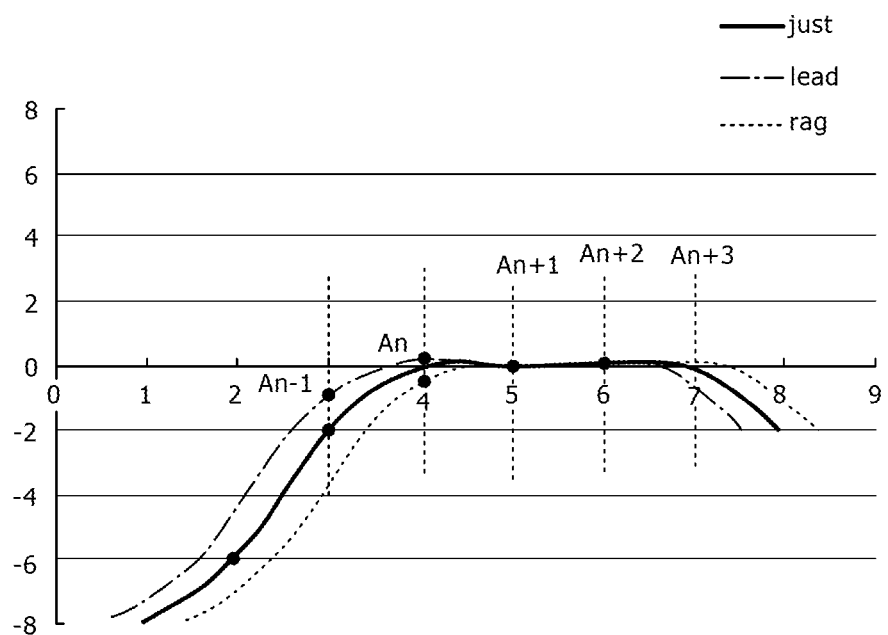
FIG. 9 is a graphic representation explanatory of a phase error detection technique for Case 3.

FIG. 9 is a graphic representation explanatory of the phase error detection technique corresponding to Case 3.

In FIG. 9, as in FIG. 4, the reproduced signal is shown individually in three states, i.e., ideal, advanced, and delayed, with regard to the phase state of the PLL. FIG. 9, like FIG. 5 above, illustrates the waveforms of the reproduced signals with their phases in the ideal, advanced, and delayed states, in such a manner that the sampling values involved are positioned in each of the three phase states. As in FIG. 5, the sampling value coinciding with the zero cross point of the reproduced signal in the ideal state in FIG. 9 is regarded as the reference sampling point indicated as $A_n$. The sampling points immediately preceding and immediately following the reference sampling point $A_n$ are indicated as $A_{n-1}$ and $A_{n+1}$, respectively. In addition, in FIG. 9, the sampling point immediately following the sampling point $A_{n+1}$ is indicated as $A_{n+2}$, and the sampling point immediately following the sampling point $A_{n+2}$ is indicated as $A_{n+3}$.

In Case 3, the NRZI data sequence is "01100111," and the ideal value of the reproduced signal transits as $\{-8, -6, -2, 0, 0, 0, 0, -2\}$.

In Case 3, the ideal value of the reproduced signal is zero. It follows that the phase error in Case 3 should be calculated using the expression 4 above. However, comparing FIG. 9 with FIG. 5 reveals that in both the rising direction (relative to point $A_n$) and the falling direction (relative to point $A_{n+3}$), the waveforms of the zero cross parts are the same as those in Case 2 of FIG. 5. With regard to these zero cross parts, the distinction between the ideal value of the reproduced signal being zero and the value being other than zero is thus made using at least the expression 6 above. The phase error is thereafter calculated by use of the expression 4.

Also, the relations between the ideal, advanced, and delayed waveforms of the zero cross parts in both the rising and the falling directions are the same as those in FIG. 5. In this case, too, the determination carried out using the expressions 6 and 7 makes it possible appropriately to eliminate the phase delayed state of the zero cross part in the rising direction and the phase advanced state of the zero cross part in the falling direction.

What is characteristic of Case 3 is that the ideal value of the reproduced signal transits as $\{0, 0, 0, 0\}$ (i.e., portion $A_n$ through $A_{n+3}$ in FIG. 9).

Where the ideal value of the reproduced signal continues as 0s, the value $|A_k-A_{k-1}|$ is very small as evident from FIG. 9. Thus when a noise-superposed reproduced signal is assumed to be actually input, it is very difficult to perform an appropriate phase error detection process on that portion.

In such a case, the lower threshold value B is established for use in the expression 7. This expression may then be used to exclude from the phase error detection process the portion where 0s appear continuously.

As will be understood from the explanation above, this embodiment involves determining whether or not the condition of $|A_k-A_{k-1}| \geq D$ as the expression 6 is met in order to make the distinction between the ideal value of the reproduced signal being other than zero and the value being zero. More specifically, if the condition of the expression 6 above is not found to be met, the ideal value of the reproduced signal is determined to be other than zero; if the condition of the expression 6 is found to be met, the ideal value of the reproduced signal is determined to be zero.

According to this embodiment, the determination above is carried out not only by verifying the condition of the expression 6 but also by ascertaining the condition of the expression 7 in which the threshold value B is established. The embodiment thus makes it possible to exclude those parts considered unfit for the phase error detection process even where the ideal value of the reproduced signal is determined to be zero using the expression 6 above. This provides more accurate phase error detection than before.

With the foregoing description taken into account, what follows is an overview of the phase error detection technique of this embodiment.

The inventive technique involves first carrying out the determination based on the expressions 6 and 7 using the sampling value $A_k$ after the zero cross and the sampling value $A_{k-1}$ before the zero cross.

If the condition of $|A_k-A_{k-1}| \geq D$ as the expression 6 is not determined to be met (i.e., if the ideal value of the reproduced signal is found to be other than zero), then the phase error is calculated through the use of the expression 1.

If the condition of $|A_k-A_{k-1}|\geq D$ as the expression 6 is determined to be met (i.e., if the ideal value of the reproduced signal is found to be zero), then the determination based on the expression 7 is carried out further. If the condition of $B\leq|A_k-A_{k-1}|$ as the expression 7 is determined to be met, then the phase error is calculated using the expression 4.

If the condition of $B\leq|A_k-A_{k-1}|$ as the expression 7 is not determined to be met, the phase error is not output.

According to the above-described technique, where PR(1, 2, 2, 2, 1) is illustratively adopted, it is possible appropriately to deal with the situation where the ideal value of the reproduced signal being other than zero occurs concurrently with the ideal value being zero. The phase error is suitably calculated using the expression 1 if the ideal value of the reproduced signal is found to be other than zero, or by use of the expression 4 if the ideal value of the reproduced signal is found to be zero.

Additionally carrying out the determination based on the expression 7 makes it possible to exclude the inappropriate zero cross part where the ideal value of the reproduced signal is other than zero. This provides more accurate phase error detection than ever.

<3. Internal Structure of the Phase Error Detection Circuit>

Below is an explanation of the particular structures by which to implement the phase error detection technique of this embodiment.

Figure 10:
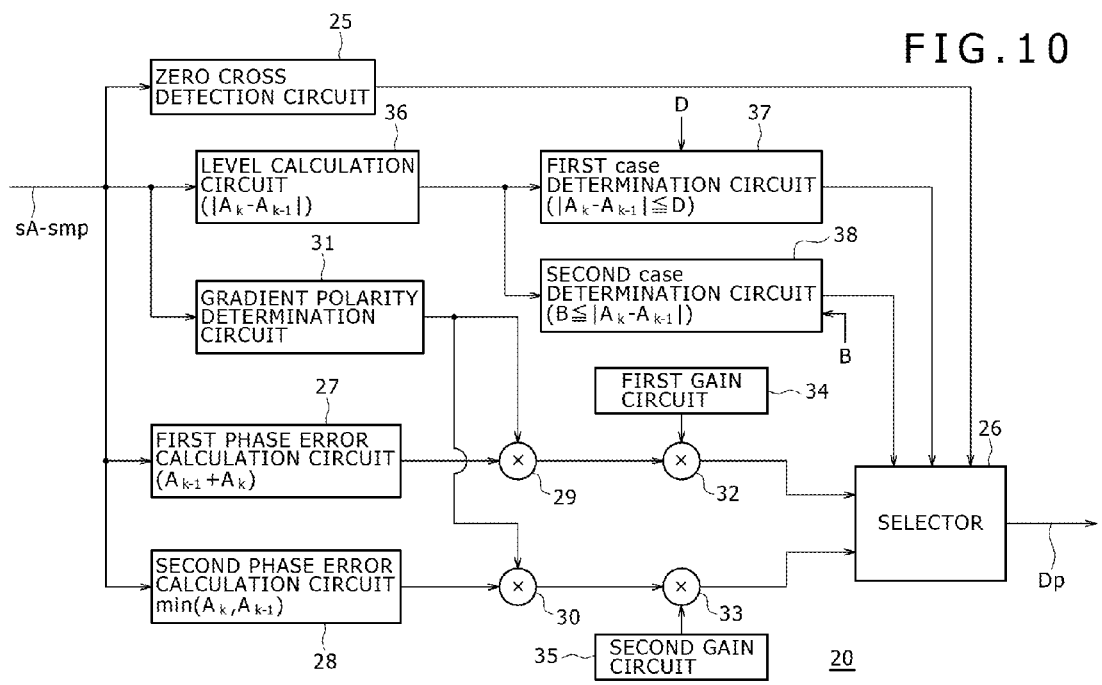
FIG. 10 is a block diagram showing an internal structure of a phase error detection circuit embodying the present invention.

FIG. 10 shows an internal structure of the phase error detection circuit 20 indicated in FIG. 2 and embodying the present invention.

As shown in FIG. 10, the phase error detection circuit 20 includes a zero cross detection circuit 25, a selector 26, a first phase error calculation circuit 27, a second phase error calculation circuit 28, multipliers 29 and 30, a gradient polarity determination circuit 31, multipliers 32 and 33, a first gain circuit 34, a second gain circuit 35, a level calculation circuit 36, a first case determination circuit 37, and a second case determination circuit 38.

The reproduced signal sA-smp from the A/D converter 8 shown in FIG. 1 (and FIG. 2) is sent to the zero cross detection circuit 25, first phase error calculation circuit 27, second phase error calculation circuit 28, gradient polarity determination circuit 31, and level calculation circuit 36, as illustrated.

The zero cross detection circuit 25 detects the zero cross part based on the polarity of the above-mentioned reproduced signal sA-smp. Specifically, the polarity of the current input value of the reproduced signal sA-smp is compared with the polarity of the immediately preceding input value. The timing at which the polarity is changed is then detected to determine the zero cross part.

A zero cross detection signal output by the zero cross detection circuit 25 is fed to the selector 26.

The phase error calculations using the expressions 1 and 4 above are to be carried out with regard to the sampling values before and after the zero cross. As will be discussed later, the selector 26 outputs phase error information Dp only if the zero cross part is pointed to by the zero cross detection signal. This prevents the (incorrect) phase error values calculated outside the zero cross part from getting output.

A value "0" is output as the value of the phase error information Dp in effect outside the zero cross part.

The first phase error calculation circuit 27 calculates the sum of the current sampling value of the reproduced signal sA-smp ($A_k$ corresponds to the zero cross part) and the immediately preceding sampling value ($A_{k-1}$ corresponds to the zero cross part). That is, the computation of "$A_{k-1}+A_k$" in the expression 1 is carried out.

The value calculated by the first phase error calculation circuit 27 is fed to the multiplier 29.

The second phase error calculation circuit 28 selectively outputs the smaller of the two values: either the current sampling value of the reproduced signal sA-smp ($A_k$ corresponds to the zero cross part), or the immediately preceding sampling value ($A_{k-1}$ corresponds to the zero cross part). This is equivalent to carrying out the computation of "$\min(A_k, A_{k-1})$" in the expression 4.

The value calculated by the second phase error calculation circuit 28 is sent to the multiplier 30.

The gradient polarity determination circuit 31 supplies each of the multipliers 29 and 30 with the plus (+) or minus (−) sign corresponding to the direction of the zero cross. More specifically, the gradient polarity determination circuit 31 detects the zero cross direction (i.e., gradient polarity) based on the polarity of the current sampling value of the reproduced signal sA-smp and on the polarity of the immediately preceding sampling value. In keeping with the polarity information thus detected, the gradient polarity determination circuit 31 gives a coefficient "+1" or "−1" to each of the multipliers 29 and 30.

The giving of the sign to the multipliers 29 and 30 by the gradient polarity determination circuit 31 allows the direction of the phase advance or phase delay to be expressed correctly. It is reaffirmed here that the giving of the sign corresponds to the multiplication of "sign" in the expressions 1 and 4 above.

The value calculated by the first phase error calculation circuit 27 via the multiplier 29 is fed to the multiplier 32. The value calculated by the second phase error calculation circuit 28 through the multiplier 30 is sent to the multiplier 33.

The multiplier 32 is supplied with a first gain from the first gain circuit 34, and the multiplier 33 is fed with a second gain from the second gain circuit 35.

The reason for giving the different gains (first and second) to the calculated values of the first phase error calculation circuit 27 and the second phase error calculation circuit 28 is the need to deal with the fact that the magnitude of the gradient in the zero cross part is different between the case where the ideal value of the reproduced signal is other than zero as shown in FIG. 4 on the one hand, and the case where the ideal value of the reproduced signal is zero as indicated in FIG. 5 on the other hand. Since the gradient in the zero cross part is different in magnitude between the above two cases, there can occur deviations of the aforementioned phase error reference if the values calculated using the expressions 1 and 4 are used unmodified.

Such deviations of the phase error reference are corrected by having the calculated value of the first phase error calculation circuit 27 and the calculated value of the second phase error calculation circuit 28 supplied with the first and the second gains, respectively. Illustratively, if the first gain is assumed to be the normally supplied gain, then the second gain may be set to be a gain different from the first gain (greater than the first gain, to be more specific) so as to correct the deviations of the phase error reference above.

The first and the second gain values need be established in such a manner that the calculated value from the first phase error calculation circuit 27 and the same calculated value from the second phase error calculation circuit 28 will represent the same phase error.

The calculated value of the first phase error calculation circuit 27 supplied with the first gain through the multiplier 32 is sent to the selector 26.

The calculated value of the second phase error calculation circuit 28 fed with the second gain via the multiplier 33 is also sent to the selector 26.

The selector 26 functions as a block that selectively outputs the phase error calculation value based on the expressions 6 and 7. The level calculation circuit 36, first case determination circuit 37, and second case determination circuit 38 are provided as blocks that effect selective control of the calculated values of the phase error.

The level calculation circuit 36 calculates the difference in absolute term between the current sampling value of the reproduced signal sA-smp and the immediately preceding value thereof. That is, the level calculation circuit 36 performs the computation of $|A_k-A_{k-1}|$ regarding the zero cross part.

The first case determination circuit 37 checks to determine whether or not the value $|A_k-A_{k-1}|$ calculated by the level calculation circuit 36 is equal to or smaller than the predetermined threshold value D. That is, a check is made to determine whether or not the condition of $|A_k-A_{k-1}| \leq D$ is met in the zero cross part. The result of the determination made by the first case determination circuit 37 is sent to the selector 26 as a first determination result signal.

The second case determination circuit 38 checks to determine whether or not the value $|A_k-A_{k-1}|$ calculated by the level calculation circuit 36 is equal to or larger than the predetermined threshold value B. That is, a check is made to determine whether or not the condition of $B \leq |A_k-A_{k-1}|$ is met in the zero cross part. The result of the determination carried out by the second case determination circuit 38 is sent to the selector 26 as a second determination result signal.

Based on the aforementioned first and second determination result signals as well as on the zero cross detection signal from the zero cross detection circuit 25 above, the selector 26 selectively outputs either the calculated value of the first phase error calculation circuit 27 input from the multiplier 32 or the calculated value of the second phase error calculation circuit 28 input from the multiplier 33.

More specifically, if the zero cross detection signal points to the zero cross part and if the first determination result signal indicates that the condition of $|A_k-A_{k-1}| \leq D$ is not met, then the selector 26 outputs the calculated value of the first phase error calculation circuit 27 as the phase error information Dp.

If the zero cross detection signal points to the zero cross part, if the first determination result signal indicates that the condition of $|A_k-A_{k-1}| \leq D$ is met, and if the second determination result signal indicates that the condition of $B \leq |A_k-A_{k-1}|$ is met, then the selector 26 outputs the calculated value of the second phase error calculation circuit 28 as the phase error information Dp.

If the zero cross detection signal does not point to the zero cross part; or if the zero cross detection signal points to the zero cross part and if the second determination result signal indicates that the condition of $B \leq |A_k-A_{k-1}|$ is not met, then the selector 26 does not output any effective information as the phase error information Dp. Specifically, the selector 26 may output the value "0" as the phase error information Dp.

<4. Effects of Phase Error Detection Carried out by the Embodiment>

According to this embodiment of the invention, as will be understood from the above explanation, it is possible properly to deal with the two coexisting cases: one in which the ideal value of the reproduced signal is other than zero, and the other in which the ideal value of the reproduced signal is zero. Where the ideal value of the reproduced signal is other than zero, the phase error is calculated using the expression 1; where the ideal value of the reproduced signal is zero, the phase error is calculated through the use of the expression 4.

That is, it is possible appropriately to obtain the phase error information not only about the zero cross part where patterns of 3T or more are involved but also about the zero cross part where patterns of 2T are involved. As a result, the inventive technique permits a significantly higher frequency of updates of the phase error information than ordinary techniques of obtaining the phase error information solely about the zero cross part where patterns of 3T or more are involved.

With the update frequency of the phase error information thus enhanced, the PLL can be made more stable than before.

According to this embodiment, the distinction between the zero cross part involving 3T or more and the zero cross part involving 2T is made by determining whether or not the absolute value $|A_k-A_{k-1}|$ is equal to or smaller than the predetermined threshold value D. Compared with the traditional technique of performing the determination through the pattern matching of bit detection results, the inventive technique virtually eliminates the response delay of the PLL. In this respect, too, the stability of the PLL is enhanced.

As described above, this embodiment involves also carrying out the determination based on the expression 7 using the lower threshold value B. This makes it possible to exclude from the scope of the phase error detection the zero cross part involving 2T if that part is found inappropriate. As a result, the phase error detection process is made more accurate than before.

According to this embodiment, the phase error value calculated using the expression 1 and the phase error value calculated based on the expression 4 are given different gains reflecting the difference in magnitude between the gradient of the zero cross part where the ideal value of the reproduced signal is other than zero on the one hand, and the gradient of the zero cross part where the ideal value of the reproduced signal is zero on the other hand. This arrangement makes it possible to correct the deviations of the phase error reference which may occur between the calculated result from the expressions 1 and the calculated result from the expression 4 due to the difference in magnitude between the aforementioned gradients. This further contributes to making the phase error detection more accurate than before.

<5. Variations>

Although one embodiment of the present invention has been explained above, this is not limitative of the invention. For example, whereas PR(1, 2, 2, 2, 1) was shown to be adopted as the PR class in the foregoing description, this invention is particularly suitable for the situation where the PR class subject to the constraint length of 5 or more with a:b=1:2 is adopted.

Although this embodiment was shown to have the threshold value D set to "4" when PR(1, 2, 2, 2, 1) is adopted, the threshold value D in practice should be set to a value corresponding to the actually adopted PR class. As will be understood from the foregoing description, the threshold value D need only be set in reference to the ideal absolute value $|A_k-A_{k-1}|$ representing the difference between the sampling value $A_k$ after the zero cross and the sampling value $A_{k-1}$ before the zero cross where the ideal value of the reproduced signal is other than zero. This arrangement also applies to situations where any other PR class is adopted.

In the foregoing description, the threshold value B was shown to be set to $|A_k-A_{k-1}|$ in effect when the half-clock phase error takes place. However, that absolute value is not limitative of the threshold value B; the threshold value may be set to any other suitable value instead.

The threshold value B need only be set to a value such as to exclude the situation where the difference between $A_k$ and $A_{k-1}$ in absolute value is very small as in Case 2, or the situation where the waveform of the reproduced signal transits near "0" as in Case 3. A desired value may be set as the threshold value B provided that at least the condition of B<D is met.

In the foregoing description, the PLL circuit was shown to be one whereby the result of integrating the phase error information Dp through the LPF is converted from digital to analog form before being input to the VCO. Alternatively, the circuit structured on the basis of the so-called ITR (interpolated timing recovery) scheme may be adopted as the PLL circuit. In this case, too, the same phase error detection techniques as those discussed above may be adopted, and these techniques provide the results equivalent to those explained above.

The structure of the phase error detection circuit described above in reference to FIG. 10 is only an example and not limitative of the present invention. According to the embodiment, the structure for effecting phase error detection need only involve calculating two phase error values based at least on the expressions 1 and 4 and selectively outputting one of the two calculated values in keeping with the result of the level check with regard to the computation of $|A_k-A_{k-1}|$.

In the foregoing description, Viterbi decoding was shown to be used for maximum likelihood processing. Alternatively, some other suitable decoding scheme may be adopted for the decoding process.

In the foregoing description, the reproduction apparatus of the present embodiment was shown to be structured as a reproduction-only apparatus solely capable of reproducing data from recording media. Alternatively, the inventive reproduction apparatus may be structured to be a recording/reproduction apparatus capable of both recording and reproducing data to and from recording media.

In the foregoing description, the reproduction apparatus of the present embodiment was shown to reproduce data from the optical recording medium. Alternatively, the inventive reproduction apparatus may be structured to reproduce data from other recording media such as hard disks or like magnetic recording media (i.e., storage media to which bit information is recorded).

In the foregoing description, the phase error detection apparatus of the present embodiment was shown to be applied to the reproduction apparatus for use with recording media. Alternatively, the inventive phase error detection apparatus may be applied to a wide range of apparatuses dealing with the PR equalized signal such as the reception apparatus of a data communication system and a broadcast reception apparatus for receiving TV broadcasts.

The present application contains subject matter related to that disclosed in Japanese Priority Patent Application JP 2009-209582 filed in the Japan Patent Office on Sep. 10, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A phase error detection apparatus comprising:
a sampling block configured to sample an input signal digitally;
a first phase error calculation block configured to calculate a phase error using a first operation expression based on $A_{k-1}+A_k$, where $A_k$ denotes a sampling value of said input signal after a zero cross and $A_{k-1}$ represents] a sampling value of said input signal before the zero cross;
a second phase error calculation block configured to calculate the phase error using a second operation expression based on $\min(A_k, A_{k-1})$, where $\min(x, y)$ denotes an operator for selecting either x or y, whichever is the smaller of the two; and
a selective output block configured to determine whether or not an absolute value
$|A_k-A_{k-1}|$ of the difference between the sampling value $A_k$ of said input signal after the zero cross, and the sampling value $A_{k-1}$ of said input signal before the zero cross, is equal to or smaller than a predetermined first threshold value, said selective output block further outputting selectively as phase error detection information either a calculated value from said first phase error calculation block or a calculated value from said second phase error calculation block depending on a result of the determination.

2. The phase error detection apparatus according to claim 1, wherein said selective output block outputs selectively, as the phase error detection information, the calculated value from said first phase error calculation block if said absolute value $|A_k-A_{k-1}|$ is determined to be neither equal to nor smaller than said predetermined first threshold value, said selective output block further outputting selectively as the phase error detection information the calculated value from said second phase error calculation block if said absolute value $|A_k A_{k-1}|$ is determined to be equal to or smaller than said predetermined first threshold value.

3. The phase error detection apparatus according to claim 2, wherein said selective output block determines whether or not said absolute value $|A_k-A_{k-1}|$ is equal to or larger than a second threshold value smaller than said predetermined first threshold value, and wherein said selective output block outputs selectively as the phase error detection information the calculated value from said second phase error calculation block if said absolute value $|A_k-A_{k-1}|$ is determined to be equal to or smaller than said predetermined first threshold value as well as equal to or larger than said second threshold value, said selective output block further outputting neither the calculated value from said first phase error calculation block nor the calculated value from said second phase error calculation block if said absolute value $|A_k-A_{k-1}|$ is determined to be neither equal to nor larger than said second threshold value.

4. The phase error detection apparatus according to claim 3, further comprising a gain providing block configured to provide a different gain to each of the calculated value from said first phase error calculation block and the calculated value from said second phase error calculation block.

5. A phase error detection method comprising the steps of:
sampling an input signal digitally;
calculating firstly a phase error using a first operation expression based on $A_{k-1}+A_k$, where $A_k$ denotes a sampling value of said input signal after a zero cross and $A_{k-1}$ represents a sampling value of said input signal before the zero cross;
calculating secondly the phase error using a second operation expression based on $\min(A_k, A_{k-1})$, where $\min(x, y)$ denotes an operator for selecting either x or y, whichever is the smaller of the two; and
determining whether or not an absolute value $|A_k-A_{k-1}|$ of the difference between the sampling value $A_k$ of said input signal after the zero cross, and the sampling value $A_{k-1}$ of said input signal before the zero cross on the other hand, is equal to or smaller than a predetermined first threshold value, said determining step further outputting selectively as phase error detection information either a calculated value from said first calculating step or a calculated value from said second calculating step depending on a result of the determination.

6. A reproduction apparatus comprising:

a reproduced signal acquisition block configured to acquire a reproduced signal of bit information recorded on a recording medium;

a sampling block configured to sample said reproduced signal digitally;

a first phase error calculation block configured to calculate a phase error using a first operation expression based on $A_{k-1}+A_k$, where $A_k$ denotes a sampling value of said reproduced signal after a zero cross and $A_{k-1}$ represents a sampling value of said reproduced signal before the zero cross;

a second phase error calculation block configured to calculate the phase error using a second operation expression based on $\min(A_k, A_{k-1})$, where $\min(x, y)$ denotes an operator for selecting either x or y, whichever is the smaller of the two;

a selective output block configured to determine whether or not an absolute value $|A_k-A_{k-1}|$ of the difference between the sampling value $A_k$ of said reproduced signal after the zero cross, and the sampling value $A_{k-1}$ of said reproduced signal before the zero cross, is equal to or smaller than a predetermined first threshold value, said selective output block further outputting selectively as phase error detection information either a calculated value from said first phase error calculation block or a calculated value from said second phase error calculation block depending on a result of the determination; and a clock generation block configured to generate a clock by performing phase locked loop control known as PLL based at least in part on said phase error detection information output by said selective output block.

7. A phase error detection apparatus comprising:

sampling means for sampling an input signal digitally;

first phase error calculation means for calculating a phase error using a first operation expression based on $A_{k-1}+A_k$, where $A_k$ denotes a sampling value of said input signal after a zero cross and $A_{k-1}$ represents a sampling value of said input signal before the zero cross;

second phase error calculation means for calculating the phase error using a second operation expression based on $\min(A_k, A_{k-1})$, where $\min(x, y)$ denotes an operator for selecting either x or y, whichever is the smaller of the two; and selective output means for determining whether or not an absolute value $|A_k-A_{k-1}|$ of the difference between the sampling value $A_k$ of said input signal after the zero cross, and the sampling value $A_{k-1}$ of said input signal before the zero cross, is equal to or smaller than a predetermined first threshold value, said selective output means further outputting selectively as phase error detection information either a calculated value from said first phase error calculation means or a calculated value from said second phase error calculation means depending on a result of the determination.

8. A reproduction apparatus comprising:

reproduced signal acquisition means for acquiring a reproduced signal of bit information recorded on a recording medium;

sampling means for sampling said reproduced signal digitally;

first phase error calculation means for calculating a phase error using a first operation expression based on $A_{k-1}+A_k$, where $A_k$ denotes a sampling value of said reproduced signal after a zero cross and $A_{k-1}$ represents a sampling value of said reproduced signal before the zero cross;

second phase error calculation means for calculating the phase error using a second operation expression based on $\min(A_k, A_{k-1})$, where $\min(x, y)$ denotes an operator for selecting either x or y, whichever is the smaller of the two;

selective output means for determining whether or not an absolute value $|A_k-A_{k-1}|$ of the difference between the sampling value $A_k$ of said reproduced signal after the zero cross, and the sampling value $A_{k-1}$ of said reproduced signal before the zero cross, is equal to or smaller than a predetermined first threshold value, said selective output means further outputting selectively as phase error detection information either a calculated value from said first phase error calculation means or a calculated value from said second phase error calculation means depending on a result of the determination; and clock generation means for generating a clock by performing phase locked loop control known as PLL based on said phase error detection information output by said selective output means.

\* \* \* \* \*